(12) United States Patent
Chan et al.

(10) Patent No.: US 10,338,661 B2
(45) Date of Patent: Jul. 2, 2019

(54) PLANNING AND MANAGING THE POWER UTILIZATION OF A BATTERY-POWERED DEVICE

(71) Applicant: International Business Machines Corporation, Armonk, NY (US)

(72) Inventors: Yuk Lung Chan, Rochester, NY (US); Heidi Lagares-Greenblatt, Jeffferson Hills, PA (US); Deepti M. Naphade, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 15/270,059

(22) Filed: Sep. 20, 2016

(65) Prior Publication Data
US 2018/0081417 A1    Mar. 22, 2018

(51) Int. Cl.
*G06F 1/329* (2019.01)
*G06F 1/3212* (2019.01)
(Continued)

(52) U.S. Cl.
CPC ............ *G06F 1/3212* (2013.01); *G06F 1/329* (2013.01); *H04W 52/0251* (2013.01); *H04W 52/0296* (2013.01); *H02J 7/0063* (2013.01); *H02J 2007/0067* (2013.01); *Y02D 10/174* (2018.01); *Y02D 10/24* (2018.01); *Y02D 70/00* (2018.01); *Y02D 70/10* (2018.01); *Y02D 70/12* (2018.01); *Y02D 70/124* (2018.01);
(Continued)

(58) Field of Classification Search
None
See application file for complete search history.

(56) References Cited

U.S. PATENT DOCUMENTS 5,565,759 A    10/1996  Dunstan
8,407,502 B1 *  3/2013  Guy ..................... G06F 1/3218
                                                          713/320

(Continued)

OTHER PUBLICATIONS

Hao, et al., "Estimating Mobile Application Energy Consumption using Program Analysis", ICSE 2013, San Francisco, USA, 2013 IEEE, p. 90-99, printed Jun. 23, 2016, <http://www-bcf-usc.edu/~halfond/papers/hao13icse.pdf>.

(Continued)

*Primary Examiner* — Paul Yen
(74) *Attorney, Agent, or Firm* — Daniel R. Simek

(57) ABSTRACT

A method for managing a battery-powered device. In one embodiment, the method includes a computer processor identifying a first plan of activities to be performed by a battery-powered device, where the first plan of activities includes an estimated first power consumption for the first plan of activities. The method further includes determining a level of power of a first battery of the battery-powered device. The method further includes generating a first set of implementation details that manage power consumption within the battery-powered device while performing the first plan of activities, based on the estimated first power consumption and the determined power level of the first battery of the battery-powered device. The method further includes applying the first set of implementation details to the battery-powered device to perform the first plan of activities.

18 Claims, 5 Drawing Sheets

(51) Int. Cl.
*H04W 52/02* (2009.01)
*H02J 7/00* (2006.01)
(52) U.S. Cl.
CPC .......... *Y02D 70/142* (2018.01); *Y02D 70/164* (2018.01); *Y02D 70/166* (2018.01); *Y02D 70/20* (2018.01); *Y02D 70/26* (2018.01)

(56) References Cited

U.S. PATENT DOCUMENTS

| | | | |
|---|---|---|---|
| 8,958,854 B1 | 2/2015 | Morley et al. | |
| 2007/0288776 A1* | 12/2007 | DeMent | G06F 1/3225 713/320 |
| 2008/0005461 A1* | 1/2008 | Toda | G06F 1/3221 711/112 |
| 2009/0054100 A1 | 2/2009 | Ishida | |
| 2010/0060350 A1* | 3/2010 | Zhang | H03H 11/1291 327/553 |
| 2012/0229095 A1* | 9/2012 | Kikkawa | H02J 7/0073 320/136 |
| 2014/0089696 A1* | 3/2014 | Chen | G06F 1/3212 713/320 |
| 2016/0043445 A1 | 2/2016 | Katpelly et al. | |
| 2017/0242727 A1* | 8/2017 | Crosby | G06F 9/4893 |

OTHER PUBLICATIONS

Lexie, et al., "Adaptive Battery Charge Scheduling with Bursty Workloads", 6 pages, Department of Computer and Information Sciences, Temple University, 6 pagesprinted Jun. 23, 2016, <http://cis-linux1.temple.edu/~jiewu/research/publications/Publication-files/Stability.pdf>.

Wang, et al., "Power estimation for mobile applications with profile-driven battery traces", 2013 IEEE International Symposium on Lower Power Electronics and Design (ISLPED), pp. 120-125, Sep. 4-6, 2013.

"Battery Life Calculator", Digi-Key Electronics, 1 page, printed Jun. 23, 2016, <http://www.digikey.com/en/resources/conversion-calculators/conversion-calculator-battery-life>.

\* cited by examiner

PLANNING AND MANAGING THE POWER UTILIZATION OF A BATTERY-POWERED DEVICE

BACKGROUND OF THE INVENTION

The present invention relates generally to the field of power management of battery-powered devices, and more particularly to modifying aspects of a battery-powered device based on a planned usage of the device.

A variety of electronic devices and mobile computing devices utilize rechargeable batteries for: providing power to a device, as an alternate power source for a device, and as a backup power source for both portable/mobile and stationary electronic devices when alternating current (AC) power is unavailable. Some electronic devices may be powered by an adapter connected to a direct current (DC) source, such as a lighter receptacle in a vehicle. While connected to a DC power source, the rechargeable batteries within the electronic devices may recharge. Typical portable electronic devices that contain rechargeable batteries include smartphones, tablet computers, laptop computers, e-readers, smart glasses, smart watches, fitness devices, cameras, recording devices, mobile test equipment, and mobile medical equipment.

Some portable electronic devices, such as cameras and recording devices, have a more uniform power consumption, thereby allowing the rechargeable batteries to be readily swapped out and replaced with fresh batteries. Other portable electronic devices (e.g., mobile computing devices), such as smart phones and laptop computers may have highly variable power consumptions, which varies based on the number of options on the electronic device that are active. For example, larger displays, higher bandwidth transceivers, global positioning systems (GPS), cameras, number of active cores, graphics processing unit (GPU), etc., and the activity of a user. In addition, the manner of utilization of an application varies the power consumption. For example, reading a primarily text-based document (e.g., limited graphics) takes significantly less power than playing or viewing a high-resolution video game or a multimedia-based application (e.g., graphic intensive). In addition, as mobile electronic devices become more sophisticated the same functionality can be designed into a smaller form-factor, which can decrease battery size without a corresponding decrease in power consumption.

SUMMARY

According to aspects of the present invention, there is a method, computer program product, and/or system for managing a battery-powered device. In an embodiment, the method includes one or more computer processors identifying a first plan of activities to be performed by a battery-powered device, where the first plan of activities includes an estimated first power consumption for the first plan of activities. The method further includes one or more computer processors determining a level of power of a first battery of the battery-powered device. The method further includes one or more computer processors generating a first set of implementation details that manage power consumption within the battery-powered device while performing the first plan of activities, based on the estimated first power consumption and the determined power level of the first battery of the battery-powered device. The method further includes one or more computer processors applying the first set of implementation details to the battery-powered device to perform the first plan of activities.

DETAILED DESCRIPTION

Figure 1:
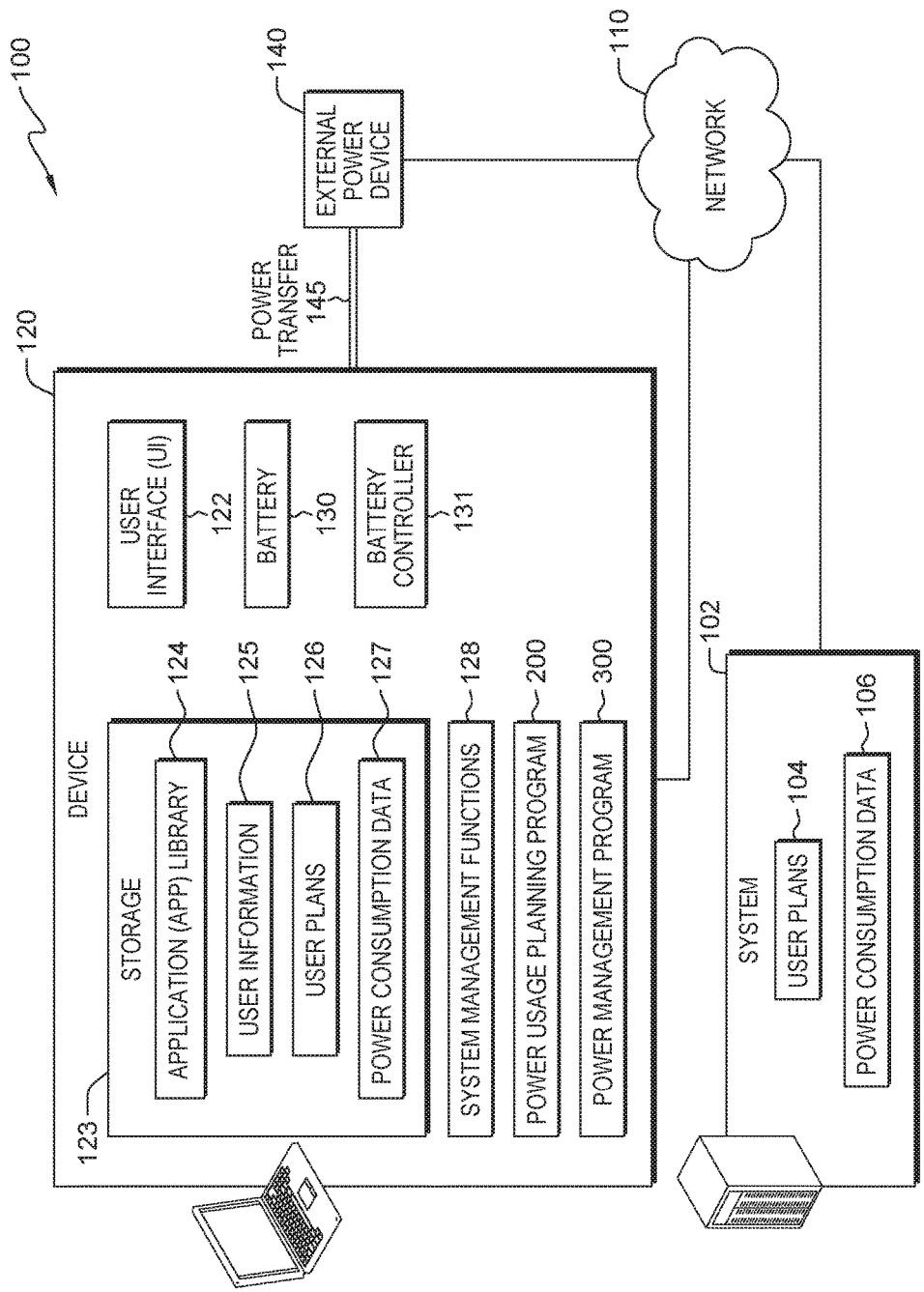
FIG. 1 illustrates a networked computing environment, in accordance with an embodiment of the present invention.

Embodiments of the present invention recognize that increased functionality and usage of mobile electronic/computing devices increases the power consumption of the mobile electronic/computing devices. However, user demand for smaller form-factor mobile electronic/computing devices dictates smaller batteries. The combination of these factors leads to a reduced time of operation for mobile electronic/mobile computing devices; herein referred to as mobile devices. While various mobile devices may include low-battery warning capabilities, a user cannot accurately anticipate how long a charge of a battery in a mobile device will last.

Embodiments of the present invention recognize that a user can modify various parameters of a mobile device via various power management setting changes. However, the power management tools of the mobile device: may not be very sophisticated, may rely on active control of various features by the user, and/or do not provide a user with estimates of a remaining charge life of the battery of the device that do not dynamically update based on a particular change to the mobile device. Some third-party software applications (apps) provide a user with a more granular control of the power management of the mobile device. Other third-party apps allow a user to prioritize app usage and include triggers to respond to power-levels of a battery within the mobile device by modifying aspects of an app, such as terminating the app, constraining one or more parameters of the app (e.g., image resolution, video framerate, display brightness, etc.) and/or reallocating resources of the mobile device among apps. However, such approaches do not provide the user with a method to plan activities for the mobile device, estimate a consumption of power, and/or estimate a battery life (i.e., duration) reduction. In addition, such approaches do not suggest and/or automatically implement power management and/or app modifications to achieve a plan of activities of a user.

Embodiments of the present invention provide a user of a mobile device the ability to plan activities for the mobile device and determine whether sufficient battery power (e.g., battery life) is stored in the battery of the mobile device to achieve a plan of activities. Embodiments of the present invention can monitor consumptions of power within the mobile device: in real-time, at designated intervals, or a combination thereof. Embodiments of the present invention provide a user interactive control of: power management features; aspects of apps, such as presentation parameters (e.g., frame rate, resolution, etc.), polling frequency; enabling/disabling of apps and/or services; enabling, disabling, and/or adjusting parameters/configurations of features (e.g., components) of the mobile device, herein identified as implementation details.

Various embodiments of the present invention generate suggestions, which are presented to a user, for modifying various implementation details to achieve a plan of activities for a mobile device. Some embodiments of the present invention automatically implement a set of implementation details to achieve a plan of activities for a mobile device. A further embodiment of the present invention can utilize power and state data from a smart-battery, external to the mobile device, to determine other suggestions and/or a different set of implementation details for a plan of activities.

Some embodiments of the present invention enable a user of a mobile device to generate (e.g., preplan) one or more plans of activities prior to initiating a plan of activities. One embodiment of the present invention enables a user to generate one or more plans of activities on the mobile device. Another embodiment of the present invention enables a user to generate one or more plans of activities on a different computing system, such as desktop computer, a server, or an Internet service; and download one or more plans of activities to the mobile device.

Other embodiments of the present invention anonymize and aggregate data from a plurality of mobile devices and users to determine: a consumption of power for features, components and services of various mobile devices; and a consumption of power of apps utilizing various configurations and/or parameters, while ensuring the privacy/security of users, apps, data, and mobile devices. Utilizing the aggregated data as opposed to relying on historical and/or real-time data of a mobile device, an embodiment of the present invention improves the suggestions for managing a consumption of power by a mobile device, in particular a mobile device that is new to a user and does not include power consumption data. In addition, the aggregated data may also include information from a plurality of plans of activities that can be used to create templates or examples for a plan of activities that a user can customize.

An alternative embodiment of the present invention can utilize a different computing device or mobile device to control the power management and/or configurations/parameters of another mobile device. In one example, a smartphone may utilize near field communication to control a plan of activities that is implemented on a smart watch or on smart glasses. In another example, a desktop computer may utilize a wireless network to access and remotely implement a plan of activities on a mobile device at a different location.

One aspect of the present invention generates an integrated user interface (UI) that simplifies access and control of various apps, configurations, components, and/or feature parameters for adjusting the features, services, and/or apps of device 120 to control the consumptions of power by and within the electronic device (e.g., mobile device). In addition, another aspect of the current invention generates various suggestions (e.g., implementation details) that a user can utilize to achieve a plan of activities. A user can enable various automated aspects of the present invention to dynamically respond to unforeseen changes and/or consumptions of power within device 120 and still achieve a plan of activities of the user.

In addition, an off-device implementation of the present invention enables a user to create (e.g., generate) a plan of activities and corresponding implementation details without consuming power of device 120 by utilizing another computing device or hosted within the Internet (e.g., a cloud service). A further benefit to an off-device implementation of the present invention include: transferring and analyzing raw power consumption data to reduce the storage requirements of device 120 and access to a wider range of: plans of activities, power consumption data, and corresponding implementation details of a plurality of users that improve the suggestions and implementation details for a plan of activities.

The present invention will now be described in detail with reference to the Figures. FIG. 1 is a functional block diagram illustrating networked computing environment 100 in an embodiment, in accordance with the present invention. In one embodiment, networked computing environment 100 includes: system 102 and device 120 are interconnected over network 110. In another embodiment, networked computing environment 100 includes: system 102, device 120, and external power device 140 are interconnected over network 110. Many modifications to the depicted environment may be made by those skilled in the art without departing from the scope of the invention as recited by the claims.

System 102 and device 120 may be laptop computers, tablet computers, netbook computers, personal computers (PC), desktop computers, personal digital assistants (PDA), smart phones, wearable devices (e.g., smart glasses, smart watches, augmented reality headset, etc.), or any programmable computer systems known in the art. In certain embodiments, system 102 and device 120 represent computer systems utilizing clustered computers and components (e.g., database server computers, application server computers, etc.) that act as a single pool of seamless resources when accessed through network 110, as is common in data centers and with cloud-computing applications. In general, system 102 and device 120 are representative of any programmable electronic device or combination of programmable electronic devices, fixed or mobile, capable of executing machine-readable program instructions and communicating with a user of system 102 and/or device 120 via network 110. For example, device 120 can be a piece of mobile medical equipment powered by a battery and controlled by: a microcontroller, an embedded PC, or an attached (e.g., docked) PC. System 102 and device 120 may include components, as depicted and described in further detail with respect to FIG. 5, in accordance with embodiments of the present invention.

System 102 includes: user plans 104 and power consumption data 106. In an embodiment, system 102 may also include various programs and/or databases, such as, but not limited to: a database management system; an e-mail program; a web interface; a calendar functions, etc. In various embodiments, system 102 includes one or more analytical, cognitive, simulation, and/or machine learning programs accessible via network 110 to generate a set of implementation details that manage a plan of activities of device 120; and/or analyze power consumptions of apps, services, and/or features (e.g., components) of mobile devices based on various parameters/configurations.

In some embodiments, system 102 also includes an instance of: UI 122, power usage planning program 200, power management program 300, or a combination thereof. For example, system 102 includes an instance of power usage planning program 200, which enables a user of device 120 to generate a plan of activities without utilizing device 120. In one scenario, system 102 is a desktop PC of a user that the user can utilize to preplan a plan of activities that is subsequently downloaded to device 120. In another scenario, system 102 is a server that includes at least power usage planning program 200 as a service that the user can utilize via the Internet. In other embodiments, system 102 stores plans of activities for one or more users within user plans 104. In addition, system 102 may collect anonymized activities plans and/or power consumption data from a plurality of users that utilize system 102 and an instance of power usage planning program 200 to generate plans of activities off line.

User plans 104 includes one or more plans of activities of a user of device 120. In one embodiment, an instance of user plans 104 includes one or more plan of activities of a user for device 120. Such a plan of activities within user plans 104 matches the construction, organization, and information (discussed in further detail with respect to user plans 126 and/or FIG. 4) of a plan of activities within user plans 126 of device 120. In some scenarios, a plan of activities within user plans 104 is uploaded from an instance of device 120 to system 102. In other scenarios, a plan of activities within user plans 104 is generated by an instance of power usage planning program 200 executing within system 102. In another scenario, user plans 104 includes a template developed by a user to aid in the creation of other plans of activities.

In another embodiment, another instance of user plans 104 includes a plurality of anonymized plans of activities and corresponding implementation details of a plurality of users and instances of various mobile devices. This other instance of user plans 104 may be analyzed by various analytical, cognitive, simulation, and/or machine learning programs of system 102 and/or accessible by system 102 to create sample plans of activities or templates and corresponding implementation details that are accessible to users via network 110. In some embodiments, a plan of activities of user plans 104 includes the corresponding consumption of power data corresponding to elements of the plan of activities.

In one embodiment, power consumption data 106 includes historical (e.g., raw) data associated with: features, components, configurations, and the execution of apps of device 120 that consume power; and/or state information of battery 130 that is supplied by battery controller 131. Power consumption data 106 may be periodically updated, via network 110 to include new raw data and/or analyzed data from power consumption data 127 of device 120. In addition, power consumption data 106 may include information and/or algorithms that relate a rate of power consumption to a rate of charge depletion (e.g., an effective power consumption) for various instances and/or ages of battery 130. Algorithms within power consumption data 106 may indicate that the consumptions of power for individual apps, services, and features of device 120 may not be strictly cumulative. In one example, an overall (e.g., cumulative, total) rate of power consumption of greater than 800 milliampere-hours (mA-h) may produce an effective power consumption of 880 mA-h, and at a higher rate of overall power consumption, such as 1300 mA-h, the effective battery life reduction may correlate to an effective power consumption that is expressed as a polynomial or an exponential equation. Alternatively, a low rate of overall power consumption, such as 350 mA-h, may produce an effective power consumption of less than the 350 mA-h.

In another embodiment, power consumption data 106 varies with time; therefore, power consumption data 106 may include data that is time-stamped, aggregated, and/or analyzed (e.g., summarized, includes statistical information, etc.). In some scenarios, power consumption data 106 includes a set of information related to one or more functions of system management functions 128 utilized to modify a consumption of power by one or more elements (e.g., features, components, services, etc.) of device 120. In other scenarios, power consumption data 106 also includes information associated with external power device 140 or other instances of external power device 140 and/or the interactions of the other instances of external power device 140 with one or more aspects of various instances of device 120, such as a rate of battery recharge in response to a powered-off state of an instance of device 120, a rate of battery recharge in response to an active state of an instance of device 120.

In other embodiments, another version of power consumption data 106 includes filtered and anonymized historical power consumption data of a plurality of instances of device 120 of other users, where various instances of device 120 are related, for example, to different models/manufactures of mobile devices and/or different configurations of mobile devices. This other version of power consumption data 106 can include power consumption data associated with: features, configurations, and/or services of each instance of device 120; the execution of various apps of another instance of device 120; and/or state information of an instance of battery 130. In addition, this version of power consumption data 106 may be accessible to users as a service or a subscription. A user may access information related to the version of device 120 that is associated with a user. In an example, a user with a new device 120 may not have information stored within power consumption data 127. A user may access power consumption data (e.g., of a device, for an app, etc.) within this different version of power consumption data 106 to populate power consumption data 127 of device 120.

Device 120 includes, user interface (UI) 122, storage 123, system management functions 128, battery 130, battery controller 131, power usage planning program 200, and power management program 300, and various apps, services, and data (not shown). Examples of apps that device 120 may include are: a web browser, an office productivity suite, one or more smart device applications (apps), an instant messaging (IM) app, etc. Examples of data that device 120 may include, but are not limited to, are: user preferences, a web browsing history, music files, video files, etc. Device 120 may include, but is not limited to, features and components (not shown), such as a GPS, a camera, a multi-core central processing unit (CPU), various wireless communication systems, multi-axis accelerometers, etc. In some embodiments, device 120 obtains electrical power from external power device 140 via power transfer 145. In various embodiments, device 120 uploads power information within power consumption data 127 to system 102 on a periodic basis and/or as dictated by a user of device 120. In addition, device 120 may upload one or more plans of activities from user plans 126 to system 102 on a periodic basis and/or as dictated by a user of device 120.

In one embodiment, UI 122 may be a graphical user interface (GUI) or a web user interface (WUI) that can display text, documents, forms, web browser windows, user options, application interfaces, and instructions for operation, and include the information, such as graphic, text, and sound that a program presents to a user. UI 122 controls sequences/actions that the user employs, such as to input and/or modify a plan of activities and/or select one or more suggestions of implementation details for device 120, via power usage planning program 200. UI 122 may also display information received from power management program 300.

In some embodiments, a user of device 120 can interact with UI 122 via a singular device, such as a touch screen (e.g., display) that performs both input to a GUI/WUI, and as an output device (e.g., a display) presenting a plurality of icons associated with apps and/or images depicting one or more executing software applications. In other embodiments, a software program, such as a web browser can generate UI 122 operating within the GUI environment of device 120. In various embodiments, multiple instances of UI 122 may be generated. For example, power usage planning program 200 may generate two instances of UI 122, which enables a user to compare the effects of different sets of implementation details for a plan of activities. In another example, an instance of UI 122 may be initiated by power management program 300 to obtain input from a user. In another embodiment, UI 122 receives input in response to a user of device 120 utilizing natural language, such as written words or spoken words, that device 120 identifies as information and/or commands.

In an alternative embodiment, UI 122 utilizes a speech-synthesizer that presents an audio description of one or more elements of a plan of activities, interface elements (e.g., menus, commands, etc.), and/or a list of suggestions to manage a consumption of power of a mobile device to achieve a plan of activities. In one example, UI 122 interfaces with a user of a mobile device based on the user selecting a "hands-free" interface. In other examples, UI 122 interfaces with a user that cannot see a GUI interface or the display of device 120 is constrained and cannot include a GUI depiction of UI 122; and therefore, device 120 does not display the GUI.

Storage 123 includes: application (app) library 124, user information 125, user plans 126, and power consumption data 127. In some embodiments, app library 124 includes a list, such as a table of the apps, services, and corresponding options of the apps and services installed on device 120. In other embodiments, app library 124 is the actual apps and/or services installed within device 120. In an embodiment, app library 124 also includes one or more analytical, cognitive, and/or machine learning programs that power usage planning program 200 utilizes to generate a set of implementation details for a plan of activities.

User information 125 includes, but is not limited to, information associated with: layouts, menus, options, etc., of UI 122; enabling dynamic power management; controls, threshold, tolerances, and/or analysis methods associated with consumption of power values; the selection of plans of activities; and priorities and/or hierarchies related to the selection of apps, features, services, components and corresponding parameters of device 120 with respect to generating implementation details for a plan of activities. In an example, user information 125 may include a dictate that identifies a "0" priority as a "must complete" element (i.e., a goal) of a plan of activities. User information 125 may also include information associated with: other devices of the user, authentication information for system 102, notifications and/or messages displayed by power usage planning program 200 or power management program 300, etc.

In addition, user information 125 may also include triggers and/or threshold values associated with one or more sources of power that supply device 120 and the effect of the triggers and/or threshold values with respect to one or more plans of activities. User information 125 may include preferences that identify and/or dictate a number of values to display for each consumption of power and an analysis method associated with determining consumption of power values of device 120 and/or of other instance of device 120 (e.g., shared data), such as an average value, a median value, a weighted average, a worst case value, a value that includes a tolerance or a range of uncertainty, etc.

User plans 126 include one or more plans of activities of a user. A plan of activities is comprised of elements that can include: one or more apps (e.g., tasks), services, and features of device 120 that a user indicates are used sequentially, in parallel, or in any combination; an estimated overall consumption of power and various implementation details. Within a plan of activities each app, service, and/or features of device 120 may include: a duration of usage, an order of usage, a level of priority, a number of uses (e.g., a number of pictures, text messages), and various implementation details. A plan of activities may also include a proposed power level of device 120, input by a user, to generate a set of implementation details. A plan of activities may be structured as: a list, a table, an associative array, two or more linked tables etc.

In some embodiments, a plan of activities also includes a hierarchy of responses to a level of power available to device 120 and/or dictated goals (e.g., "must complete" elements). In an example, a hierarchy of responses for a plan of activities for a reduced level of power within battery 130 may include: deactivating one or more apps and/or services of device 120, and/or utilizing a different set of implementation details. In another example, a hierarchy of responses for a plan of activities may include different sets of responses that activate in response to an increase of power available to device 120. In a different example, the hierarchy of responses within one plan of activities can indicate to activate a different plan of activities and terminate the original plan of activities. In various embodiments, a plan of activities may include triggers and/or responses based on information within user information 125 and/or one or more aspects of device 120, such as time and date, and/or a strength of a wireless network signal of network 110.

Power consumption data 127 includes information related to features, components, configurations, and the execution of apps of device 120 that consume power within device 120. Power consumption data within power consumption data 127 may be based on: time, each use (e.g., a picture), a volume of data, one or more parameters of an app, service, and/or component of device 120, etc. In an embodiment, power consumption data 127 includes power consumption data for one or more apps, one or more services, and one or more features of device 120 based on a specific set of implementation details. In another embodiment, data within power consumption data 127 may be periodically analyzed, such as by one or more statistical functions (not shown) and the results of the analysis stored within power consumption data 127. In addition, an aspect of the present invention may periodically purge some or all of the raw power consumption data within power consumption data 127 while retaining the results of the analyzed data within power consumption data 127. In various embodiments, power consumption data 127 includes power consumption data and/or algorithms related to a rate of charge depletion of a power source (e.g., battery 130) that are download from power consumption data 106 of system 102. In an example, power consumption data 127 is populated (e.g., augmented) with power consumption data stored within power consumption data 106 of system 102 that is related to an app, service, feature, and/or implementation detail of device 120 that is not yet determined for device 120, such as a newly installed app, a newly activated feature, a different set of configuration parameters, etc.

System management functions 128 is a program and/or a suite of functions that controls the state of various components, features, and services of device 120, such as enabling/disabling a camera or a GPS system, the clock speed of a microprocessor, the number of active core of the microprocessor, etc. In one embodiment, one or more functions of system management functions 128 are included as firmware within device 120. In another embodiment, one or more functions of system management functions 128 are configurable options of a service executing within device 120. In some embodiments, various functions of system management functions 128 are third-party apps that are installed on device 120. In various embodiments, system management functions 128 stores power consumption data to power consumption data 127. In addition, system management functions 128 may store a copy of real-time power consumption data in volatile memory of device 120.

In other embodiments, system management functions 128 includes one or more functions that interface with battery 130 and/or battery controller 131 to determine a rate of consumption of power for device 120. In a further embodiment, system management functions 128 also includes one or more programs and/or functions that can determine the consumption of power of individual apps, services, and/or features of device 120. System management functions 128 store power consumption data within power consumption data 127. In addition, system management functions 128 may store battery life (e.g., duration) data corresponding to various rates of power consumption (i.e., mA-h) of device 120 within power consumption data 127.

In one embodiment, battery 130 is a rechargeable battery that is included within device 120 and is not readily changed (e.g., requires tools to access, etc.). In another embodiment, battery 130 is comprised of one or more individual batteries, such as in a digital camera or a battery pack (e.g., a group of cells) configured for use within device 120. In some scenarios, one instance of battery 130 may be "swapped-out" and replaced with another instance of battery 130 to provide electrical power to device 120. In other scenarios, some instances of battery 130 may be recharged in-situ. In various embodiments, battery 130 is a smart battery. A smart battery can internally measure voltage and current, deduce a charge level and SoH (State of Health) parameters, and/or indicate the state of the cells of the battery. In addition, a smart battery can indicate: to stop recharging, to initiate recharging, or to communicate to a device to stop using power from the smart battery.

Battery controller 131 includes electronics and components that enable device 120 and power management program 300 to monitor battery 130 and obtain various state data, such as voltage, charge level, etc. of battery 130. For example, state data may be communicated from battery controller 131 to device 120 via a system management bus (SMBus) (not shown). In some embodiments, battery controller 131 controls: the consumption power from battery 130, the recharging of battery 130, and/or utilization of electrical power input via power transfer 145.

Power usage planning program 200 is a program that generates a plan of activities for a device 120 based on one or more inputs of a user and a set of information related to items that consume power within device 120. In addition, power usage planning program 200 generates a set of implementation details (e.g., suggestions) that may enable a user to complete (e.g., achieve) the activities of a plan of activities. In one embodiment, power usage planning program 200 executes on device 120. In another embodiment, power usage planning program 200 executes on another computing system or on another mobile device enabling a user to generate a plan of activities off line. In some embodiments, power usage planning program 200 executes concurrently with power management program 300. In other embodiments, power management program 300 initiates an instance of power usage planning program 200.

In a further embodiment, power usage planning program 200 aggregates anonymized plans of activities, device characteristics, and corresponding sets of implementation details. In one example, power usage planning program 200 utilizes, on a periodic basis, one or more: analytical programs, cognitive programs, and/or machine learning to analyze the aggregated plans of activities, characteristics of devices, power consumptions, and/or and corresponding sets of implementation details to improve the accuracy of implementation details generation and/or generating new suggestions for plans of activities and the corresponding sets of implementation details. In another example, power usage planning program 200 utilizes, on a periodic basis, one or more: analytical programs and/or statistical functions to analyze the aggregated activities, characteristics of devices, power consumptions, and/or corresponding sets of implementation details to improve the accuracy of information included within power consumption data 106 of system 102. Power usage planning program 200 may download the results of analyzed data of power consumptions and/or implementation details of installed apps, services, and/or features of device 120 from power consumption data 106 on a periodic basis, and/or as dictated by a user.

Power management program 300 is a program that obtains a plan of activities for device 120, monitors the consumptions of power within device 120, monitors the power level of one or more power sources utilized by device 120, and initiates various implementation details of a plan of activities to achieve the plan of activities on device 120. In one embodiment, power management program 300 operates autonomously and activates various implementation details within a plan of activities of device 120 to achieve (e.g., complete) the plan of activities. In some embodiments, power management program 300 activates an instance of power usage planning program 200 in response to unplanned power consumptions within device 120, such as the activation of one or more features of device 120, and/or an excess utilization (e.g., additional pictures, a download of a larger data file, etc.) associated with one or more elements of a plan of activities to obtain one or more suggestions to achieve the plan of activities.

In other embodiments, power management program 300 responds to determining that the power level of device 120 is not sufficient to support (e.g., achieve) a plan of activities by interfacing with a user of device 120 via UI 122. Power management program 300 utilizes UI 122 to enable the user to: modify a plan of activities, change various parameters and/or configuration of apps and services of device 120, and/or deactivate/modify one or more features of device 120 to generate a solution to the consumption of power of the plan of activities and device 120 to achieve or modify a plan of activities. In various embodiments, power management program 300 executes an instance of power usage planning program 200 to generate one or more sets of implementation details (e.g., suggestions) that are presented to the user via UI 122. Power management program 300 receives responses from the user via UI 122 to modify a plan of activities and/or select various implementation details to generate a solution to the power consumptions of the plan of activities and of device 120.

In one embodiment, device 120 communicates through network 110 to system 102. In another embodiment, system 102 communicates with one or more other computing systems and/or computing resources, such as a web server, e-mail server, a data aggregation service, etc. (not shown) via network 110. In some embodiments, device 120 communicates through network 110 to external power device 140.

Network 110 can be, for example, a local area network (LAN), a telecommunications network, a wireless local area network (WLAN), such as an intranet, a wide area network (WAN), such as the Internet, or any combination of the previous and can include wired, wireless, or fiber optic connections. In general, network 110 can be any combination of connections and protocols that will support communications between system 102, device 120, and external power device 140, in accordance with embodiments of the present invention. In various embodiments, network 110 operates locally via wired, wireless, or optical connections and can be any combination of connections and protocols (e.g., personal area network (PAN), near field communication (NFC), laser, infrared, ultrasonic, etc.).

In one embodiment, external power device 140 is a power adapter for device 120, such as an AC adapter, a DC power adapter, a trickle-charger, a wireless (e.g., inductive) charger, a solar powered electricity source, etc. In another embodiment, external power device 140 is a backup power source for device 120, such as an uninterruptable power supply (UPS) or an external battery (e.g., an external battery extender, an external battery bank, etc.). In some embodiments, external power device 140 recharges battery 130 of device 120 utilizing battery controller 131. In other embodiments, external power device 140 replaces the electrical power that battery 130 provides device 120. For example, if battery controller 131 detects that external power device 140 is connected to device 120, then battery controller 131 ceases the consumption of power from battery 130 until external power device 140 is depleted or disconnected.

In various embodiments, external power device 140 supplements (e.g., augments) the electrical power that battery 130 supplies to device 120 thereby increasing the life of battery 130 or enabling a different plan of activities and/or configuration of resources of device 120. External power device 140 may include monitoring hardware and/or software that determines state information, such as a voltage, a charge, a discharge rate, etc. of external power device 140. In addition, external power device 140 may include components, as depicted and described in further detail with respect to FIG. 5, in accordance with embodiments of the present invention. In an alternative embodiment, external power device 140 is another mobile device that powers, recharges, and/or shares a plan of activities with device 120. In an example, external power device 140 may be a laptop computer connected to a smartphone (i.e., device 120) via a cabled instance of power transfer 145.

In one embodiment, power transfer 145 is representative of a wired connection that transfers electrical power from external power device 140 to device 120. In another embodiment, power transfer 145 is representative of a wireless transfer of electrical power (e.g., inductive charging) from external power device 140 to device 120. In some embodiments, power transfer 145 includes a communication connection between external power device 140 and battery controller 131 of device 120. Power transfer 145 may transfer state data of external power device 140 that is utilized by power usage planning program 200 and/or power management program 300. In a further embodiment, power transfer 145 is representative of a wired connection (e.g., USB™) that transfers power from external power device 140 to device 120 and also acts as in instance of network 110 to establish communications and to transfer data between external power device 140 and device 120.

Figure 2:
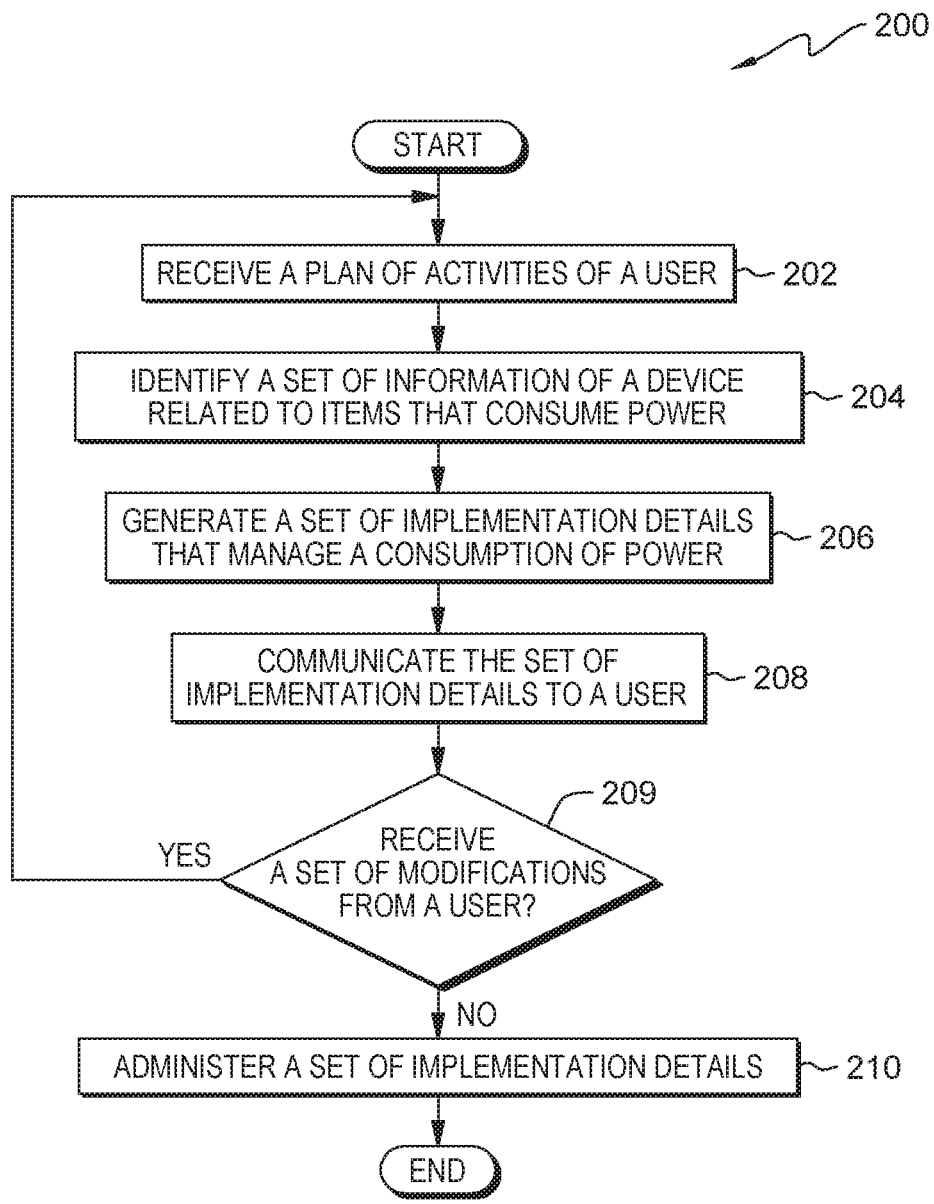
FIG. 2 depicts a flowchart of the operational steps of a power usage planning program, in accordance with an embodiment of the present invention.

FIG. 2 is a flowchart depicting operational steps for power usage planning program 200, a program that generates a plan of activities for a mobile device based on one or more inputs of a user and a set of information related to items that consume power of device 120, in accordance with embodiments of the present invention. In addition, power usage planning program 200 generates a set of implementation details (e.g., suggestions) that may enable a user to complete the activities of a plan of activities. In various embodiment, power usage planning program 200 may display, from various sources, one or more plans of activities and/or planning templates concurrently to enable a user to perform a side-by-side comparison.

In one embodiment, power usage planning program 200 executes on device 120. In another embodiment, power usage planning program 200 executes on another computing system or on another mobile device enabling a user to generate a plan of activities off line. In some embodiments, power usage planning program 200 executes concurrently with power management program 300. In other embodiments, power management program 300 initiates an instance of power usage planning program 200.

In step 202, power usage planning program 200 receives a plan of activities of a user. In one embodiment, power usage planning program 200 receives a plan of activities of a user of device 120 via UI 122 of device 120. In one example, power usage planning program 200 receives a plan of activities that a user created off line, such as a user creating a plan of activities based on a template obtained from user plans 104 of system 102. In another example, power usage planning program 200 dynamically (e.g., step-by-step) receives one or more activities of a plan of activities from a user via UI 122. An illustrative example of inputs that power usage planning program 200 receives via an instance of UI 122 is discussed in further detail with respect to FIG. 4.

In some embodiments, power usage planning program 200 cycles (e.g., loops) and execute various steps and decisions to enable a user to see one or more effects of one or more activities and/or modifications to a set of implementation details of a plan of activities for device 120. Power usage planning program 200 can depict various aspects of a plan of activities and/or a corresponding set of implementation details for a mobile device via one or more screens/pages/menus displayed by one or more instances of UI 122 based on preferences within user information 125. In addition, a user may enable dynamic power management for the plan of activities. For example, a user selects, via UI 122, an app of app library 124 and inputs one or more parameters, such as time to be associated with an activity of the app. In response, power usage planning program 200 can access an instance of power consumption data (e.g., power consumption data 127) to determine the effect that the app and associated parameters have on battery life. A user may repeat this process to create a plan of activities.

In another embodiment, power usage planning program 200 receives a plan of activities of a user from another computing device, such as system 102 via network 110. In an example, a user utilizes a desktop PC (e.g., system 102)

to create a plan of activities, within user plans 104, for device 120. In another example, power usage planning program 200 receives a plan of activities that a user created utilizing a service accessible via the Internet. An instance of power usage planning program 200 that executes on system 102 may enable a user to create a plan of activities that is transmitted to device 120 via network 110. In another example, power usage planning program 200 receives a copy of a plan of activities or a template that is displayed in a portion of UI 122 that enables a user to create a side-by-side comparison of a modified plan of activities. Alternatively, an instance of power usage planning program 200 that executes on system 102 may store a plan of activities within user plans 104 for subsequent retrieval by an instance of power usage planning program 200 that executes on device 120.

In various embodiments, power usage planning program 200 receives a previously created plan of activities and corresponding set of implementation details. Power usage planning program 200 may also retrieve a corresponding set of implementations for the plan of activities. In one scenario, power usage planning program 200 receives an indication from a user, via UI 122, to retrieve a previously created plan of activities to modify.

In step 204, power usage planning program 200 identifies a set of information of a device related to items that consume power. Some information related to items that consume power are included within a plan of activities. Power usage planning program 200 identifies a set of information of device 120 related to items that consume power, such as apps, services, and features (e.g., components) of device 120. In one embodiment, power usage planning program 200 identifies a set of information related to items that consume power of device 120 from information included in power consumption data 127. In another embodiment, power usage planning program 200 identifies a set of information related to items of device 120 that consume power from information included in power consumption data 106 of system 102. In some embodiments, power usage planning program 200 identifies a set of information associated with device 120 that provides additional power to device 120, such as external power device 140, which: supplements the power of battery 130, powers device 120, recharges battery 130, or a combination thereof; and indicates one or more conditions that suspends the transfer of power.

In various embodiments, if power usage planning program 200 determines that a portion of the set of information related to items that consume power within device 120 is not included within power consumption data 127 of device 120, then power usage planning program 200 accesses another instance of power consumption data 106 that includes the anonymized power consumption data of a plurality of users and/or mobile devices. In one scenario, power usage planning program 200 downloads a copy of the missing portion of power consumption data related to the items of plan of activities from the other instance of power consumption data 106. In some scenarios, the other instance of power consumption data 106 may not include all of the missing portion of the power consumption data related to the items of a plan of activities; therefore, power usage planning program 200 is constrained to identify and download similar examples of power consumption data. Based on one or more preferences within user information 125, power usage planning program 200 may: present the examples of the similar power consumption data to the user of device 120, utilize high values of the similar power consumption data, utilize an average, utilize values of the similar power consumption data, etc.

In step 206, power usage planning program 200 generates a set of implementation details that manage a consumption of power. A set or a selection of implementation details may include, but are not limited to: identifying and stopping one or more apps or services that execute in the background of device 120 that are not utilized by aspects of a plan of activities, changing a set of parameters and/or configurations of an app, changing a set of parameters and/or configurations of a service of device 120, and/or changing a set of parameters and/or configurations of one or more features of device 120. In addition, a set of implementation details may include other suggestions for device 120, such as scheduling a time and minimum duration to recharge battery 130 prior to initiating a plan of activities, which are communicated to the user of device 120. Some implementation details may utilize time to activate or stop: apps, services, and/or features of device 120 that are required to execute concurrently, for at least a portion of a plan of activities. In one embodiment, power usage planning program 200 may utilize a set of information included within user information 125 to determine a priority associated with generating a set of implementation details, such as adjusting parameters of one or more apps before determining changes to one or more features of device 120, or that generates a set of implementation details that ensure that activities identified as goals are achievable.

In another embodiment, power usage planning program 200 generates one or more sets of implementation details that manage a consumption of power based on an input from a user, such as a proposed power level or the completion of the plan of activities. In various embodiments, power usage planning program 200 generates a selection of implementation details as opposed to sets of implementation that manage a consumption of power for a plan of activities for device 120. In one example, power usage planning program 200 utilizes various thresholds and settings within user information 125 to generate a selection of implementation details that provides an additional 30% reduction in power consumption and a user can utilize UI 122 to select (e.g., mix-and-match) and/or modify various implementation details. In another example, dynamic power management is enabled and power usage planning program 200 generates a selection of implementation details, based on information with user information 125, that provides an additional 20% reduction in power consumption and indicates that various implementation details are identified as "on-demand" as opposed to "inactive."

In some embodiments, power usage planning program 200 utilizes one or more analytical, cognitive, and/or machine learning programs within app library 124 to generate one or more sets of implementation details that manage a consumption of power for a plan of activities of device 120. In other embodiments, power usage planning program 200 utilizes information, determined by power management program 300, such as a level of power of a power source of device 120, unplanned consumptions of power within device 120, the status of a plan of activities, and/or configuration information of device 120 to generate another set of implementation details that manage a consumption of power based on current conditions and/or states of device 120. In some scenarios, power usage planning program 200 flags this other set of implementation details for dynamic power management (e.g., autonomous activation) as discussed in further detail with respect to step 312 of power management program 300. In other scenarios, power usage planning program 200 interfaces with a user via UI 122 to select one or more elements of this other set of implementation details that manage the consumption of power, as discussed in further detail with respect to step 314 of power management program 300.

Still referring to step 206, in a further embodiment, power usage planning program 200 utilizes one or more analytical, cognitive, and/or machine learning programs accessible via network 110 to generate one or more sets or selections of implementation details that manage a consumption of power for a plan of activities of device 120. For example, power usage planning program 200 may access a simulation program of system 102, such as a stochastic simulation or a Monte Carlo-type simulation, to generate one or more sets of implementation details for a plan of activities of device 120 based on a plan of activities, stored within user plans 104 and power consumption data 106 of system 102 and/or power consumption data 127 of device 120.

In step 208, power usage planning program 200 communicates a set of implementation details to a user. Power usage planning program 200 may include implementation details and/or suggestions for a plan of activities within the GUI used to create a plan of activities. In one embodiment, an instance of power usage planning program 200 communicates a set of implementation details for a plan of activities to a user of device 120 via UI 122. The effects of various activities and/or implementation details can be depicted via UI 122 and are discussed in further detail with respect to GUI 400 of FIG. 4.

In another embodiment, an instance of power usage planning program 200 communicates a set of implementation details for a plan of activities to a user of device 120 via another instance of UI 122 (not shown) that executes on system 102. In response, power usage planning program 200 may receive responses from a user: selecting one or more implementation details from a list (e.g., set) of suggested implementation details and/or changes to a plan of activities. In addition, power usage planning program 200 may receive information from a user, such as a name for a plan of activities; identifying a storage location for a plan of activities and corresponding implementation details (e.g., user plans 126 of device 120); an indication that a plan of activities is complete, etc. In an alternative embodiment, power usage planning program 200 receives an indication to save an in-progress (e.g., incomplete) plan of activities and corresponding set of implementation details, and subsequently power usage planning program 200 terminates.

In some embodiments, power usage planning program 200 stores a set of implementation details for a plan of activities and awaits a response from a user. In some scenarios, power usage planning program 200 stores a plan of activities and a corresponding set of implementation details based on information received from a user or information included in user information 125. In other scenarios, power usage planning program 200 anonymizes information associated with a copy of a plan of activities and a corresponding set of implementation details that is stored in another instance of user plans 104 of system 102. In an example, power usage planning program 200 is offered to a user as-a-service that includes a sharing of plans of activities, device characteristics, and sets of implementation details that can be provided to other users. Power usage planning program 200 anonymizes information associated with copies of plans of activities, corresponding sets of implementation details, and suggestions to generate templates for plans of activities and corresponding sets of implementation details that other users may access, such as by a license or subscription.

In decision step 209, power usage planning program 200 determines whether a set of modifications is received from a user. In one embodiment, power usage planning program 200 determines that a set of modifications is received from a user, based on changes to one or more activities/tasks (e.g., elements) of a plan of activities and/or one or more changes to a set of implementation details. In another embodiment, power usage planning program 200 determines that a set of modifications is received from a user based on changes to a previously created plan of activities and/or a corresponding set of implementation details that is received (e.g., retrieved). In some embodiments, power usage planning program 200 determines that a set of modifications is received from a user based on changes to a plan of activities and/or a corresponding set of implementation details based on one or more interactions with power management program 300. In other embodiments, power usage planning program 200 determines that a set of modifications is not received from a user based on the user indicating, via UI 122, that the plan of activities and/or corresponding set of implementation details are incomplete. In one scenario, if the user does not respond to power usage planning program 200 within a predetermined period of time, then power usage planning program 200 terminates.

In response to determining that a set of modifications is received from a user (Yes branch, decision step 209), power usage planning program 200 loops to step 202.

In response to determining that a set of modifications is not received from a user (No branch, decision step 209), power usage planning program 200 administers a set of implementation details (step 210).

In step 210, power usage planning program 200 administers a set of implementation details. In one embodiment, power usage planning program 200 administers (e.g., activates) a set of implementation details by communicating a set of implementation details and/or corresponding plan of activities of a user to power management program 300. In one scenario, power usage planning program 200 communicates a set of implementation details and/or corresponding plan of activities of a user of power management program 300 executing on device 120. In another scenario, power usage planning program 200, executing on device 120, administers a set of implementation details by communicating a set of implementation details and/or a corresponding plan of activities for another mobile device (not shown) to power management program 300. In this scenario, power management program 300 executes on device 120 and controls one or more aspects of the other mobile device via a local instance of network 110, such as via a PAN or by utilizing NFC. In an example, power usage planning program 200 administers a set of implementation details by communicating, via network 110, a set of implementation details and/or a corresponding plan of activities from device 120 to an aspect of the another mobile device, such as an instance of system management functions 128 of another mobile device.

Figure 3:
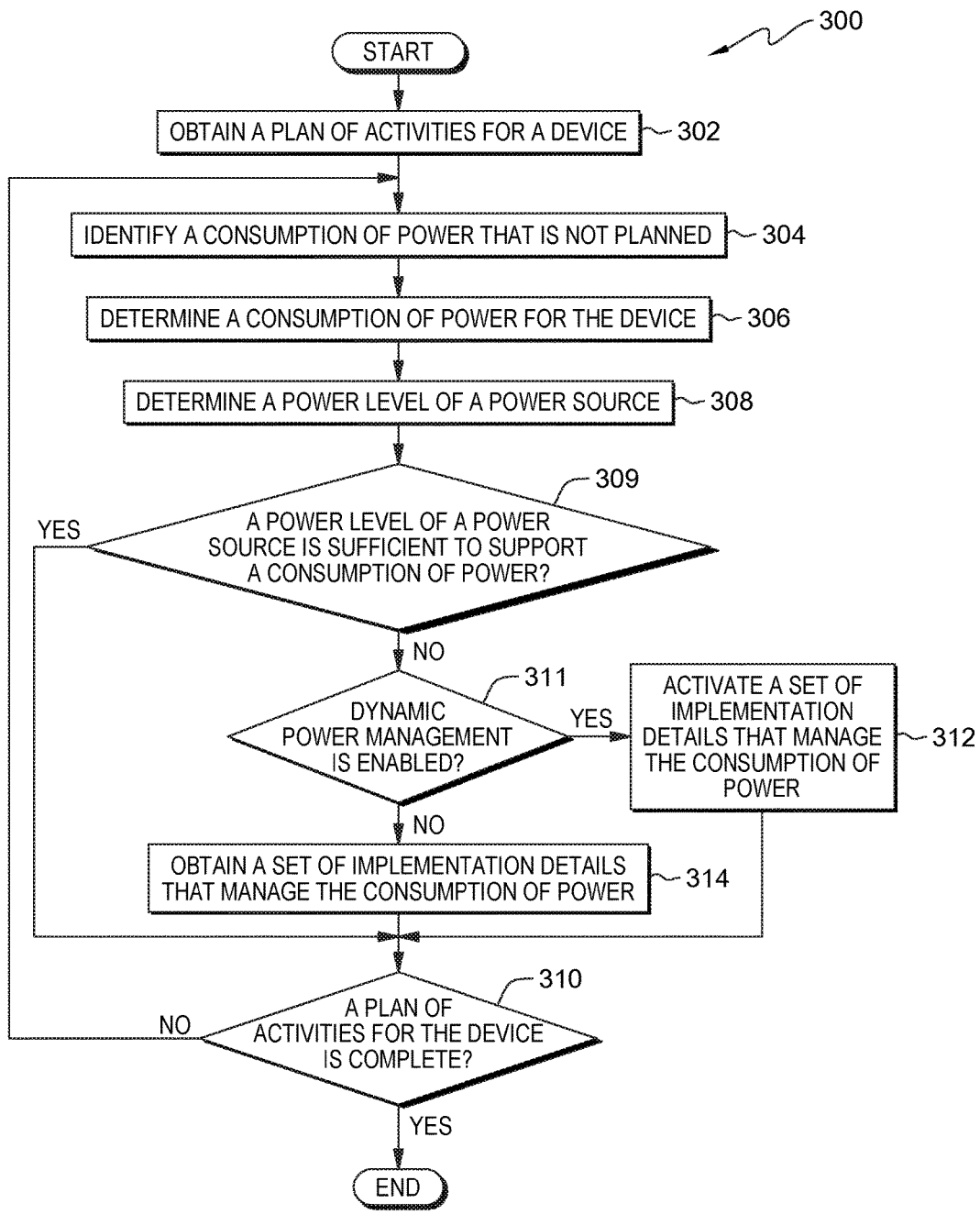
FIG. 3 depicts a flowchart of the operational steps of a power management program, in accordance with an embodiment of the present invention.

FIG. 3 is a flowchart depicting operational steps for power management program 300, a program for monitoring the power consumptions within device 120, the power level of one or more power sources utilized by device 120, and initiating various implementation details of a plan of activities to achieve the plan of activities on device 120, in accordance with embodiments of the present invention. In one embodiment, power management program 300 operates autonomously and initiates various implementation details within a plan of activities for device 120 to achieve (e.g., complete) the plan of activities utilizing device 120. In some embodiments, power management program 300 initiates an instance of power usage planning program 200 in response to unplanned increases in consumptions of power within device 120, such as the execution of other apps, activation of one or more features of device 120, and/or an excess associated with one or more elements of a plan of activities to obtain one or more suggestions to achieve the plan of activities. In various embodiments, power management program 300 utilizes UI 122 to interface with a user of device 120 in response to identifying one or more items that affect a plan of activities.

In step 302, power management program 300 obtains a plan of activities for a device. A plan of activities obtained by power management program 300 may include: one or more activities and associated parameters; an estimate of a consumption of power for the plan of activities; one or more parameters and/or configurations for features of device 120; and/or at least one set of implementation details for the plan of activities and device 120. In one embodiment, power management program 300 obtains a plan of activities for device 120 from user plans 126 within device 120. In another embodiment, power management program 300 obtains (e.g., downloads) a plan of activities for a device 120 from user plans 104 of system 102. In some embodiments, power management program 300 receives information, input by a user via UI 122, that indicates the plan of activities that power management program 300 obtains.

In other embodiments, power management program 300 receives information that identifies the plan of activities that power management program 300 obtains. In one scenario, power management program 300 receives a message or trigger from an app executing on device 120, such as a calendar function, an alarm function, or a batch file that identifies the plan of activities that power management program 300 obtains. In another scenario, power management program 300 receives information from an external source, such as system 102 or a desktop PC (not shown) of a user that identifies the plan of activities that power management program 300 obtains. In various scenarios, power management program 300 receives information from an external source that includes the plan of activities of a user for device 120.

In various embodiments, power management program 300 identifies and selects (e.g., obtains) a plan of activities based on a time-value (e.g., a start time, a start time/date) included, for example, within a plan of activities of user plans 126. Power management program 300 pauses execution until one or more criteria is met, such as: the system clock of device 120 meets or exceeds the time-value associated with a plan of activities, an indication (e.g., trigger) from a user is received, a planned activity is initiated, a power level of battery 130 drops below a threshold value, etc. In a further embodiment, power management program 300 obtains two or more plans of activities that correspond to device 120 and a different mobile device (not shown) that are linked by power transfer 145 and network 110 and share power to achieve at least one plan of activities and/or one or more high-priority elements of the two or more plans of activities.

In step 304, power management program 300 identifies a consumption of power that is not planned. In one embodiment, power management program 300 compares the elements of a plan of activities to the plurality of activities, such as executing apps, and active features of device 120, etc., that consume power within device 120. In another embodiment, power management program 300 determines a consumption of power that is not planned by utilizing one or more aspects of system management functions 128 to identify consumptions of power within device 120 and determines which consumptions of power do not correspond to elements of the plan of activities of device 120. In some scenarios, power management program 300 may determine deviations related to a consumption of power for individual elements of a plan of activities. In other scenarios, power management program 300 may determine a deviation related to consumptions of power for one or more groups of elements of a plan of activities. In some instances, power management program 300 may identify an increase consumption of power. In an example, power management program 300 determines that a plan of activities includes taking pictures with the camera of device 120. However, the extra power consumed by utilizing the flash for taking a picture was not included in the plan of activities. In other instances, power management program 300 may identify a decreased consumption of power.

In various embodiments, the consumption of power within device 120 varies with time during the plan of activities; therefore, power management program 300 may utilize various triggers, delays, and/or hierarchy of events to determine whether a consumption of power is planned or not planned. In an example, an event occurs that causes to change the order in which the user initiates elements of a plan of activities. Power management program 300 can match consumptions of power within device 120 based on the execution of an app as opposed to the time and/or order at which the app is planned to execute.

In step 306, power management program 300 determines a consumption of power for the device. In one embodiment, power management program 300 determines a consumption of power for the device 120 based on real-time monitoring of the plurality of executing apps (i.e., activities). In addition, power management program 300 determines a consumption of power for one or more features, systems, and/or services executing (e.g., active) within device 120, such as a camera, a GPS system, a wireless communication mode etc. Power management program 300 may utilize one or more aspects of system management functions 128 to determine the overall, real-time power consumption of device 120. In another embodiment, power management program 300 determines a pseudo real-time consumption of power for device 120 utilizing one or more polling rates to initiate the one or more aspects of system management functions 128 to determine the consumption of power by various aspects of device 120. The utilization of one or more aspects of system management functions 128 to determine one or more consumptions of power within device 120 adds an additional consumption of power within device 120.

In some embodiments, power management program 300 determines a consumption of power for device 120 based on historic (e.g., previously determined) power consumption data for a plurality of apps, services, elements of a plan of activities, and/or features of device. In an example, power management program 300 may utilize historic data for consumptions of power included in power consumption data 127 and/or power consumption data 106. In one example, power management program 300 utilizes real-time power consumption data to augment power consumption data that is not included in power consumption data 127. In some scenarios, power management program 300 may utilize one or more mathematical or statistical methods, such as a moving average or a cumulative moving average to reduce triggering unnecessary responses that occur due to changed and/or unplanned consumptions of power.

In addition, power management program 300 loops until a plan of activities for the device is complete; thereby enabling power management program 300 to identify and respond to changes of the consumptions of power within device 120 to achieve the plan of activities. In a further embodiment, power management program 300 may utilize one or more algorithms included in power consumption data 127 and/or power consumption data 106 to determine an effective power consumption that more accurately determines the depletion of a power source.

In step 308, power management program 300 determines a power level of a power source. In one embodiment, power management program 300 determines a power level for battery 130. In another embodiment, power management program 300 determines a power level for external power device 140, such as a UPS or a battery extender, that supplies power to device 120 via power transfer 145. In some embodiments, power management program 300 determines a power rate for external power device 140, such as in inductive charger, an AC adapter, a solar power source, etc. that recharges battery 130 via power transfer 145. In a further embodiment, power management program 300 determines a power level for external power device 140, such as a laptop that shares power to device 120 via power transfer 145. In some instances, power management program 300 determines that external power device 140 supplies power to device 120. In other instances, power management program 300 determines that external power device 140 consumes power from battery 130 of device 120.

In decision step 309, power management program 300 determines whether a power level of a power source is sufficient to support a consumption of power. In one embodiment, power management program 300 determines that a power level of a power source is sufficient to support a consumption of power based on comparing the power level of one or more power sources (e.g., battery 130, external power device 140) to the combined consumption of power for the plan of activities and identified unplanned consumptions of power within device 120. In another embodiment, power management program 300 determines that a power level of a power source is sufficient to support a consumption of power based on comparing the power level of one or more power sources to the combined consumption of power for the plan of activities and identified unplanned consumptions of power within device 120 based on a prior activation of one or more implementation details. In one example, power management program 300 determines that a power level of a power source is sufficient to support a consumption of power based on previously deactivating/terminating one or more unplanned consumptions of power. In another example, power management program 300 determines that a power level of a power source is sufficient to support a consumption of power based on a previous change to various parameters (e.g., implementation details), such as clock speed and the number of active CPU cores of device 120 that reduce the consumption of power.

Responsive to power management program 300 determining that a power level of a power source is sufficient to support a consumption of power (Yes branch, decision step 309), power management program 300 determines whether a plan of activities for the device is complete (decision step 310).

In decision step 310, power management program 300 determines whether a plan of activities for the device is complete. In one embodiment, power management program 300 determines that a plan of activities for device 120 is complete (e.g., achieved) in response to determining that each activity of a plan of activities has occurred and that each activity (e.g., app) of the plan of activities is terminated and/or suspended by the user of device 120. In another embodiment, power management program 300 determines that a plan of activities for device 120 is complete in response to determining that one or more activities, such as "must complete" goals of a hierarchy of activities within a plan of activities have occurred and are identified as complete based on information associated with the plan of activities and/or user information 125. In some embodiment, in response to determining that a plan of activities for the device is complete (Yes branch, decision step 310), power management program 300 terminates. In other embodiments, in response to power management program 300 determining that a first plan of activities for device 120 is complete and/or that one or more user criteria/dictates are met, such as a remaining level of power; another instance power management program 300 initiates and obtains a second plan of activities and the current instance of power management program 300 terminates (Yes branch, decision step 310). In a further embodiment, power management program 300 also determines a status for a plan of activities based on: a completion percentage for each activity, whether a user terminates or idles an activity, etc.

In decision step 310, responsive to determining that a plan of activities for the device is not complete (No branch, decision step 310), power management program 300 loops to step 304 to monitor: the plan of activities, device 120, and/or consumptions of power of and within device 120.

Referring to decision step 309, responsive to determining that a power level is not sufficient to support a consumption of power (No branch, decision step 309), power management program 300 determines whether dynamic power management is enabled (decision step 311).

In decision step 311, power management program 300 determines whether dynamic power management is enabled. Power management program 300 utilizes dynamic power management to automatically utilize one or more implementation details to achieve a plan of activities on device 120. In one embodiment, power management program 300 determines that dynamic power management is enabled based on an indication included in a plan of activities, such as a flag or "must complete" goal. In another embodiment, power management program 300 determines that dynamic power management is enabled based on information within user information 125. In an alternative embodiment, power management program 300 determines that dynamic power management is enabled based on information received via network 110. In an example, device 120 is linked to external power device 140, such as a laptop. Power management program 300 determines that dynamic power management is enabled based on external power device 140 controlling one or more aspects of device 120 to achieve a plan of activities on device 120. Responsive to determining that dynamic power management is enabled (Yes branch, decision step 311), power management program 300 activates a set of implementation details to manage the consumption of power (step 312).

In step 312, power management program 300 activates a set of implementation details that manage a consumption of power. In one embodiment, power management program 300 automatically activates a set of implementation details that manage a consumption of power that are included in the obtained plan of activities of device 120. In another embodiment, power management program 300 activates a set of implementation details that manage a consumption of power (e.g., dynamic power management) based on a set of implementation details (e.g., suggestions) generated by activating an instance of power usage planning program 200. In some embodiments, power management program 300 activates different implementation details of the set of implementation details based on the status (e.g., identifies the goals, apps and/or elements of a plan of activities that are complete) of a plan of activities, the consumptions of power of and within device 120, and/or a level of power of a power source.

In an alternative embodiment, power management program 300 activates a set of implementation details that manage a consumption of power of device 120 based on the set of implementation details received from another computing device (not shown) via network 110. In another example, device 120 is not a mobile device but a rack of servers and external power device 140 is a UPS. Power management program 300 activates a set of implementation details to complete various tasks and sequences of actions (e.g., a plans of activities) and responds to the level of power within external power device 120 by "gracefully" shutting down servers as tasks complete. A graceful shutdown may include: preventing additional tasks or requests from initiating, completing transactions in progress, saving data, suspending network activity, pausing the server, and powering off a server. Subsequently, power management program 300 determines whether a plan of activities for the device is complete in decision step 310.

Referring to decision step 311, responsive to power management program 300 determining that dynamic power management is not enabled (No branch, decision step 311), power management program 300 obtains a set of implementation details that manage the consumption of power (step 314).

In step 314, power management program 300 obtains a set of implementation details that manage the consumption of power. In one embodiment, power management program 300 obtains a set of implementation details that manage the consumption of power by interfacing with a user of device 120 via UI 122 and are discussed in further detail with respect to FIG. 4. In an example, power management program 300 presents the current plan of activities and corresponding implementation details and/or suggestion to a user via UI 122. In response, power management program 300 receives manual input from the user via UI 122, such as a change to the current plan of activities (e.g., skipping an activity, eliminating an unplanned consumption of power, modifying a configuration feature of device 120, etc.). In another embodiment, power management program 300 executes an instance of power usage planning program 200 to generate a second set of implementation details and/or suggestions to manage the power of device 120 that are presented to the user of device 120 via UI 122.

In some embodiments, power management program 300 communicates with system 102 via network 110 to obtain a set of implementation details that manage the consumption of power of device 120 from an instance of power usage planning program 200 that executes within system 102. Power management program 300 presents the obtained set of implementation details that manage the consumption to a user of device 120 via UI 122. In response, power management program 300 receives manual inputs from the user that indicates which implementation details of the presented set of implementation details to utilize. In a further embodiment, various mobile devices are linked and share power. Power management program 300 communicates the status, information, and plans of activities of each of the linked mobile devices to an instance of power usage planning program 200 to generate one or more integrated plans of activities based on input from a user via UI 122. Subsequently, power management program 300 determines whether a plan of activities for the device is complete in decision step 310.

Figure 4:
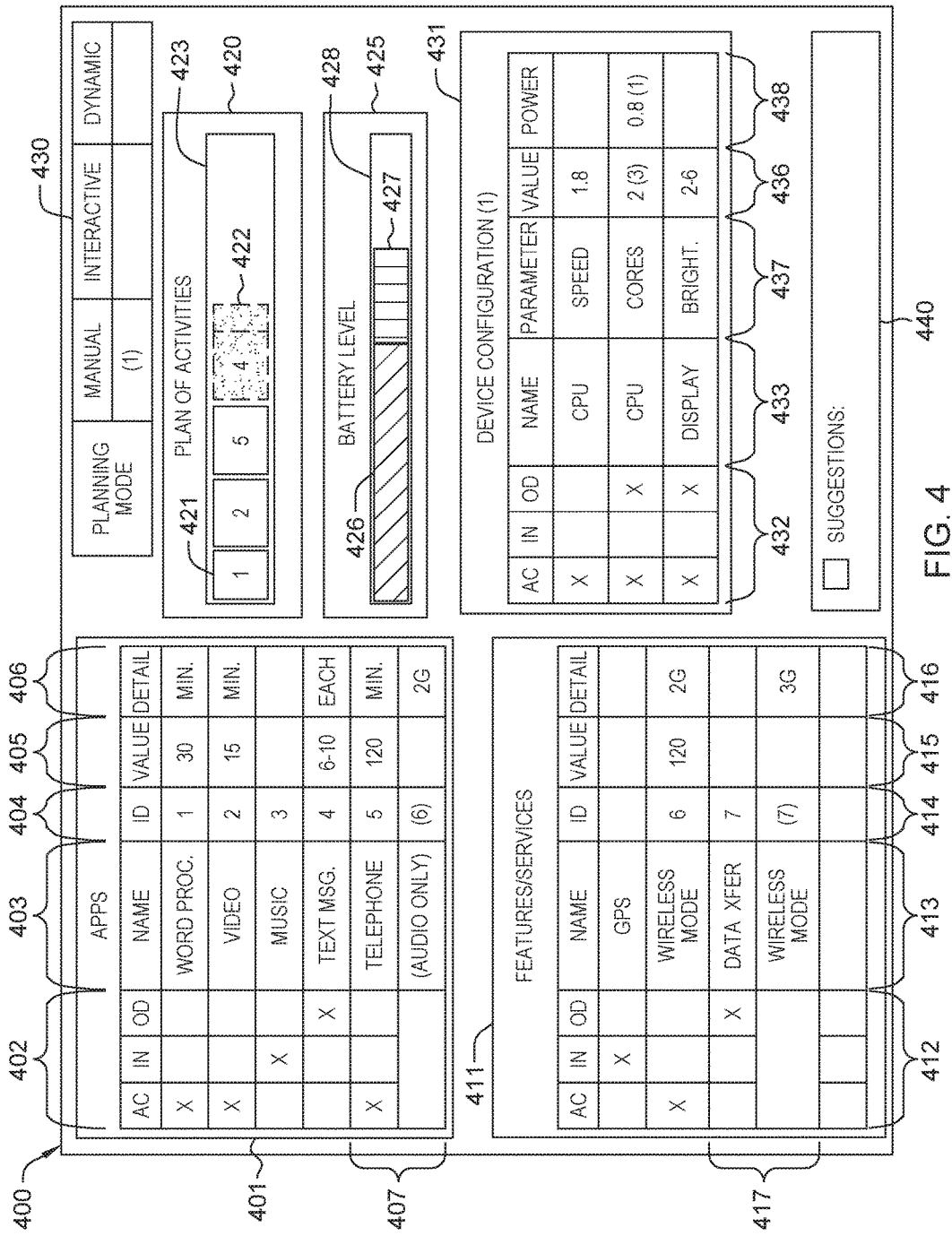
FIG. 4 is an illustrative example of a graphical user interface used to create a plan of activities and select implementation details, in accordance with an embodiment of the present invention.

FIG. 4 is an illustrative example depicting an instance of UI 122 used to create a plan of activities and/or select implementation details, in accordance with an embodiment of the present invention. In an illustrative example, GUI 400 is generated by power usage planning program 200 and depicts a plan of activities for device 120 and various implementation details manually configured by a user. In some embodiments, GUI 400 may be simplified or may include increased complexity to enable more granular presentation and/or control of a plan of activities and consumptions of power.

In one embodiment, GUI 400 is representative of a portion of UI 122. UI 122 may also include elements not shown, such as a tool bar, a name for a plan of activities, a file control drop-down menu, various hot-key combinations, and icons and/or menus that control the size and/or placement of GUI 400, etc. In an illustrative example, GUI 400 is comprised of three menus (menu 401, menu 411, and menu 431), depicted as tables with cells that enable a user to control a plurality of inputs to a plan of activities and corresponding implementation details. GUI 400 also includes planning mode menu 430 and suggestions menu 440. In an embodiment, based on information included in one or more menus, power usage planning program 200 generates one or more instances of plan of activities 420 and/or one or more instances of battery level indicator 425.

In one embodiment, menus 401, 411, and 431 respectively include activity controls, identification (i.e., "NAME"), and value elements arranged in columns, such as the activity controls of columns 402, 412, and 432; "NAME" of columns 403, 413, and 433; and "VALUE" of columns 405, 415, and 436. A value within a cell of columns 405, 415, and 436 can be a discrete value, a range of values, or a selection of values associated with a condition, such as "on-demand." In this illustrative example, parenthesis "( )" enclosing a VALUE or ID signify that the element or value is associated with another element or is enabled based on various conditions or triggers.

Menu 401 and menu 411 include "ID" values within respective cells within columns of 404 and 414 and correspond to activity blocks included within plan of activities 420. The assignment order of "ID" values within menu 401 and 411 will be based on a user preference. With respect to menu 401 and menu 411, columns 406 and 416 correspond to "DETAIL" information associated with and/or describing the value included in the corresponding cells of columns 405 and 415 of a row of menu 401 and menu 411. In an example, rows 407 of menu 401 are associated with a TELEPHONE app where the cell within column 405 includes the numeric value of 120 and a corresponding description MIN. (i.e., minutes) as the description of the unit associated with the numeric value. With respect to menu 431, the values within cells of column 436 relate to a corresponding "PARAMETER" of column 437 for each row.

In an example, the initial (primary) item identified within columns 403, 413, and/or 433 signifies an identity of an app, feature, service, or component of device 120. In some embodiments, selecting a primary name (e.g. element) of columns 403, 413, and/or 433 generates a drop-down menu that enables a user to select a feature or constraint associated with the primary name. In an example, within menu 401, rows 407 include a primary name for the app of TELEPHONE. Selecting TELEPHONE generates a list of options (not shown) such as a constraint of "AUDIO ONLY." Such a constraint reduces the power consumed by the TELEPHONE app by eliminating the need to supply resources of device 120 required to support acquiring, transmitting, and/or receiving pictures and video, such as a camera or GPU of device 120. In one embodiment, power usage planning program 200 uses information entered within a cell of one menu to populate information within a cell of another menu. In an illustrative example, information input for the TELEPHONE activity of rows 407, such as the VALUE of "120" within column 405 is populated within column 415 of menu 411 for "WIRELESS MODE" with ID value of "6." Similarly, information input within menu 411, such as ID "6" and DETAIL of "2G" for the wireless communication service of device 120 populates within rows 407 of menu 401.

Similarly, within menu 411, rows 417 are related to a service of data transfer ("DATA XFER") between device 120 and network 110, such as uploads and/or downloads of data. For rows 417, the cells of column 415 are blank, which in one instance, signifies that the value is not constrained, and a corresponding cell of column 416 signifies the wireless mode for data transfer is 3G as opposed to 2G for the TELEPHONE app. The 3G wireless communication mode utilizes more power but, in various scenarios, transfers data more efficiently, effectively reducing the consumption of power.

In an embodiment, menu 401, menu 411, and menu 431 respectively include activity controls within columns 402, 412, and 432 that are further divided into three columns that enable a named element to be: active (AC), inactive (IN), on-demand (OD) or a combination thereof. In some embodiments, columns 402, 412, and 432 may include controls that are mutually exclusive (e.g., radio-buttons). In other embodiments, cells within columns 402, 412, and 432 may interact, such as allowing an app, features, service, or component of device 120 to respond to changes within device 120 and/or one or more actions of a user. In an illustrative example, within column 432 of device configuration menu 431, cells for both AC and OD are enabled for named component "CPU." As an example, device 120 includes a quad-core CPU. Information included within the cells of columns 432, 433, 437, and 436 by a user, indicates that the CPU is active and utilizes 2 cores. However, based on the performance of device 120, as determined system management functions 128, device 120 may activate the third core "on-demand," such as during activity ID "2" displaying a video. In another embodiment, a user may include a value for priority level for a cell within columns 402, 412, and 432 as opposed to a generic selection, such as "X." In various embodiments, utilizing of an indication, such as a priority of "0" (e.g., "must complete goal") within a cell of columns 402 and/or 412, dictates that dynamic power management is enables and the checkbox of suggestions menu 440 is automatically selected.

In some embodiments, menu 401, menu 411, and menu 431 are organized by rows that correspond to one or more aspects (e.g., details, parameters, etc.) of a named app, a feature/service, or a device configuration element of a plan of activities and/or device 120. In some scenarios, a named app, a feature/service, or a device configuration element of one row of one menu is related to one or more aspects of another row of another menu.

In one embodiment, menu 401, menu 411, and/or menu 431 are automatically populated with information based on information within app library 125, power consumption data 127, and system management functions 128. In another embodiment, menu 401, menu 411, and/or menu 431 are automatically populated with information based on a previously created plan of activities. Menu 401, menu 411, and/or menu 431 may include various scroll bars or other GUI elements (not shown) to access elements of menus that cannot be displayed within an instance of GUI 400 based on the area of GUI 400 and/or UI 122.

In one embodiment, plan of activities 420 is populated with activities by a user utilizing a drag-and-drop or a copy-and-paste method to select an activity from menu 401 and place the activity within planning box 423. The order of activities within planning box 423, such as activity 421 and activity 422 may be representative of the order in which a user plans to execute an activity. In some embodiments, planning box 423 of planning activities 420 is a similar length of the fully charged power level of battery fuel gauge 428. In various embodiments, the length box representative of each activity is proportional to an estimated consumption corresponding to the activity. Activity 422 corresponds to activity 4, TEXT MSG., and is depicted by a partitioned, dashed box (speckled shading). In this illustrative example, the two portions of the box of activity 422 are representative of the estimated range of power consumption indicated by the range of 6-10 within a cell of column 405 of menu 401 corresponding to activity ID "4." The left portion of the dashed box of activity 422 corresponds to the estimated power consumption of 6 text messages, and the full length of the dashed box of activity 422 corresponds to the estimated power consumption of 10 text messages.

In an illustrative example, battery level indicator 425 includes battery fuel gage 428 and an estimated consumption of power of power of device 120 based on features, services, configuration, and implementation details as depicted by element 426 (diagonally hashed shading). Element 427 (vertically hashed shading) indicates the current power level of battery 130). The unshaded area of battery fuel gage 428 beyond element 427 is representative of the depleted power of battery 130. Elements 426 and 427 may be a proportional representation relative to the total power of battery 130 when fully charged. The size of element 426 dynamically varies as various implementation details are included or modified within menus 401, 411, and 431. Battery fuel gage 428 may also include an indication or hoverbox identifying a remaining battery life duration. In addition, various aspects or depictions within battery level indicator 425 may change in response to connecting external power device 140 to device 120, such as including an instance of battery fuel gauge 428 related to external power device 140.

In an illustrative example, planning mode menu 430 includes three options for a planning mode: manual, interactive, and dynamic that, in some embodiments, are mutually exclusive. In addition, a value included within a planning mode selection, such as "(1)" may indicate the number of certain menus that are generated. In one embodiment, the value included in a planning mode indicates the number of instances GUI 400 that are generated. In another embodiment, the value included in a planning mode indicates the instances of plan of activities 420 and corresponding instances of battery level indicator 425 that are generated within GUI 400. In another embodiment, the value included in a planning mode indicates the instances of menu 431 and corresponding instances of battery level indicator 425 that are generated for plan of activities 420 within GUI 400.

With respect to planning mode menu 430, in response to the selection of manual planning mode, a user may have control of many aspects of menus 401, 411, 431, and the checkbox of suggestions menu 440 may be manually selected by a user. In an example, in response to the selection of interactive mode, the checkbox of suggestions menu 440 is selected and implementation details are dynamically updated as a user adds activities to plans of activities 420. A user may select one or more implementation details during the creation of a plan of activities and see the effect within the elements of plan of activities 420 and/or battery level indicator 425. In another example, in response to the selection of dynamic mode, the checkbox of suggestions menu 440 is selected and implementation details are dynamically incorporated within a plan of activities based on the estimated consumption of power for a plan of activities (e.g., element 426) and the power available within a power source, such as battery 130. In some scenarios, user preferences may modify the conditions for utilizing implementation details.

In an illustrative example, menu 431 is representative of a GUI interface that is associated with one or more functions of system management functions 128. Column 433 includes identification information associated with various components of device 120 that can be modified to affect the consumption of power within device 120. Column 437 is representative of a parameter corresponding to the named element/component of device 120 within column 433 and associated by rows. In an example, cells of column 438 may depict the relative effect on the consumption of power that values within cells of column 436 have on device 120 as determined based on information within power consumption data 127. A single value within a cell of column 436 and/or a lack of information within power consumption data 127 may leave a cell within menu 431 blank.

Suggestions menu 440 includes a checkbox that activates the display of various implementation details that power usage planning program 200 generates, in Step 206, to achieve a plan of activities. Suggestion menu 440 is affected by the mode selection of planning mode menu 430. In addition, as one or more elements are added and/or removed from menus 401 and 411 the displayed implementation details may dynamically update. In one scenario, information associated with an implementation detail may be manually added or modified within menus 401, 411, or 431. In some scenarios, selecting an implementation detail of suggestion menu 440 automatically includes that implementation detail within the appropriate menu. In other scenarios, implementation details within suggestion menu 440 can be selectively included in different instances of menu 431. In addition, battery level indicator 425 dynamically updates based on utilizing an implementation detail.

Figure 5:
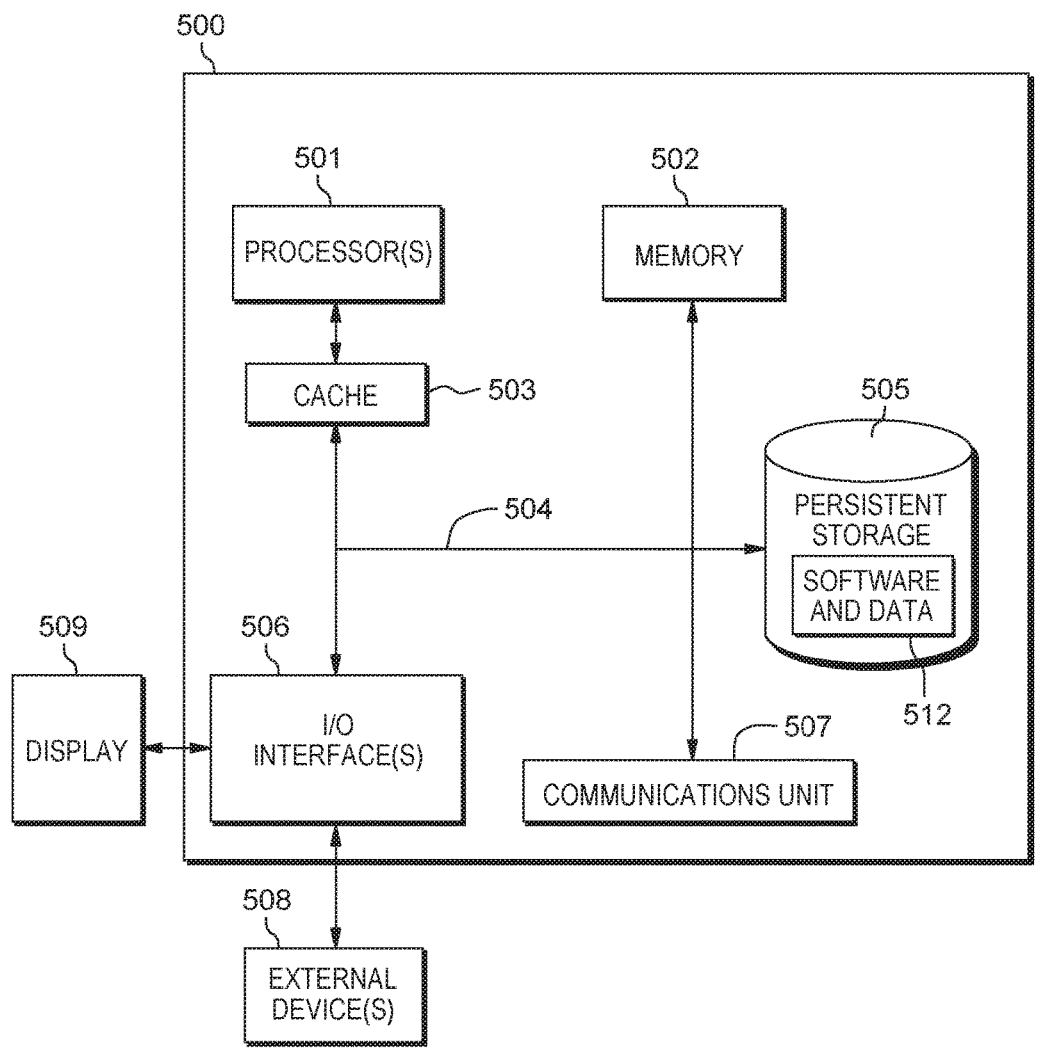
FIG. 5 is a block diagram of components of a computer, in accordance with an embodiment of the present invention.

FIG. 5 depicts a block diagram of computer system 500, which is representative of system 102 and device 120. Computer system 500 is an example of a system that includes software and data 512. Computer system 500 includes processor(s) 501, memory 502, cache 503, persistent storage 505, communications unit 507, input/output (I/O) interface(s) 506, and communications fabric 504. Communications fabric 504 provides communications between memory 502, cache 503, persistent storage 505, communications unit 507, and I/O interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 are stored in persistent storage 505 for access and/or execution by one or more of the respective processor(s) 501 via cache 503 and one or more memories of memory 502. With respect to system 102, software and data 512 includes: user plans 104, power consumption data 106, and various programs (not shown). With respect to device 120, software and data 512 includes UI 122, app library 124, user information 125, user plans 126, power consumption data 127, system management functions 128, power usage planning program 200, and power management program 300.

Communications unit 507, in these examples, provides for communications with other data processing systems or devices, including resources of system 102 and device 120. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Software and data 512 used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor. Display 509 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the phrase "based on" should be interpreted to mean "based, at least in part, on."

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing a battery-powered device, the method comprising:
   identifying, by one or more computer processors, a first plan of activities to be performed by a battery-powered device, wherein an activity includes utilization of a software application on the battery-powered device, wherein the first plan of activities includes a list of a plurality of software applications installed on the battery-powered device and a corresponding sequence to utilize the plurality of software applications, and wherein the first plan of activities includes an estimated first power consumption to complete the first plan of activities;
   determining, by one or more computer processors, a level of power of a first battery of the battery-powered device;
   generating, by one or more computer processors, a first set of implementation details that manage power consumption within the battery-powered device while performing the first plan of activities, based on the estimated first power consumption and the determined power level of the first battery of the battery-powered device, wherein the first set of implementation details includes one or more implementation details respectively associated with each activity, and wherein the one or more implementation details respectively associated with each activity manages the consumption of power associated by the battery-powered device while utilizing one or more functional services of the battery powered device, one or more components of the battery powered device, and a software application respectively utilized during each activity; and
   in response to initiating the first plan of activities, applying, by one or more computer processors, the first set of implementation details to the battery-powered device based on a status associated with each activity of the first plan of activities, wherein the status associated with an activity indicates whether the activity is started and a percent of completion of the activity, and wherein applying the first set of implementation details to the battery-powered device further comprises:
   determining, by one or more computer processors, a corresponding power level of the first battery prior initiating each activity; and
   applying, by one or more computer processors, to the battery-powered device, at least one implementation detail that manages the respective consumption of power associated with each activity based on the power level corresponding to the first battery prior to initiating each activity and a percentage of completion for each activity of the first plan of activities.

2. The method of claim 1, wherein the first plan of activities further includes: one or more functional services of the battery-powered device to utilize while performing one or more respective activities of the first plan of activities, one or more parameters of the software application respectively associated with each activity, one or more components of the battery-powered device, and one or more parameters corresponding to a component of the battery-powered device to utilize while performing the one or more respective activities of the first plan of activities.

3. The method of claim 1, wherein the estimated first power consumption to complete the first plan of activities is based on historical power consumptions selected from the group consisting of each software application and related parameters of the plurality of software applications of the first plan of activities, one or more functional services of the battery-powered device utilized while performing the one or more respective activities of the first plan of activities, and one or more components of the battery-powered device utilized while performing the one or more respective activities of the first plan of activities.

4. The method of claim 1, wherein the generated first set of implementation details include one or more actions that are selected from the group consisting of:
   modifying one or more parameters of an executing software application on the battery-powered device;
   disabling one or more functional services of the battery-powered device;
   modifying one or more parameters of an executing functional service of the battery-powered device;
   disabling one or more components of the battery-powered device; and
   modifying one or more parameters of a component of the battery-powered device.

5. The method of claim 1 further comprising:
   identifying, by one or more computer processors, while performing the first plan of activities, one or more power consumptions within the battery-powered device that are not included within the first plan of activities;
   generating, by one or more computer processors, a second set of implementation details that manage power consumption within the battery-powered device while performing the first plan of activities, based on the identified one or more consumptions of power within the battery-powered device that are not included within the first plan of activities, the estimated first power consumption, and the determined power level of the first battery of the battery-powered device.

6. The method of claim 1, wherein generating a first set of implementation details that manage power consumption within the battery-powered device while performing the first plan of activities further comprises: identifying, by one or more computer processors, one or more functional services that execute in the background of the battery-powered device that the battery-powered device does not utilize to perform the first plan of activities; and in response to identifying the one or more functional services that execute in the background of the battery-powered device that are unnecessary to perform that first plan of activities, updating, by one or more computer processors, the first set of implementation details to disable the one or more functional services of the battery-powered device that are unnecessary to perform that first plan of activities.

7. The method of claim 1, wherein generating a first set of implementation details that manage power consumption within the battery-powered device while performing the first plan of activities further comprises:

identifying, by one or more computer processors, one or more components of the battery-powered device that the battery-powered device does not utilize to perform the first plan of activities; and in response to identifying the one or more components of the battery-powered device that are unnecessary to perform that first plan of activities, updating, by one or more computer processors, the first set of implementation details to disable the one or more components of the battery-powered device that are unnecessary to perform that first plan of activities.

8. The method of claim 1, further comprising:

determining, by one or more computer processors, while performing the first plan of activities, another level of power of the first battery of the battery-powered device;

determining, by one or more computer processors, a status respectively associated with the plurality of software applications of the list of software applications included within the first plan of activities; and modifying, by one or more computer processors, a selection of implementation details of the first set of implementation details associated with the first plan of activities that are applied to the battery-powered device based, at least in part, on the status respectively associated with one or more software applications of the list of software applications included in the first plan of activities and the determined other level of the first battery of the battery-powered device.

9. A computer program product for managing a battery-powered device, the computer program product comprising:

one or more computer readable storage media and program instructions stored on the one or more computer readable storage media, the program instructions readable/executable by one or more computer processors:

program instructions to identify, a first plan of activities to be performed by a battery-powered device, wherein an activity includes utilization of a software application on the battery-powered device, wherein the first plan of activities includes a list of a plurality of software applications installed on the battery-powered device and a corresponding sequence to utilize the plurality of software applications, and wherein the first plan of activities includes an estimated first power consumption to complete the first plan of activities;

program instructions to determine a level of power of a first battery of the battery-powered device;

program instructions to generate a first set of implementation details that manage power consumption within the battery-powered device while performing the first plan of activities, based on the estimated first power consumption and the determined power level of the first battery of the battery-powered device, wherein the first set of implementation details includes one or more implementation details respectively associated with each activity, and wherein the one or more implementation details respectively associated with each activity manages the consumption of power associated by the battery-powered device while utilizing one or more functional services of the battery powered device, one or more components of the battery powered device, and a software application respectively utilized during each activity; and in response to initiating the first plan of activities, program instructions to apply the first set of implementation details to the battery-powered device based on a status associated with each activity of the first plan of activities, wherein the status associated with an activity indicates whether the activity is started and a percent of completion of the activity, and wherein program instruction to apply the first set of implementation details to the battery-powered device further comprise:

program instruction to determine a corresponding power level of the first battery prior initiating each activity; and program instructions to apply, to the battery-powered device, at least one implementation detail that manages the respective consumption of power associated with each activity based on the power level corresponding to the first battery prior to initiating each activity and a percentage of completion for each activity of the first plan of activities.

10. The computer program product of claim 9, wherein the first plan of activities further includes: one or more functional services of the battery-powered device to utilize while performing one or more respective activities of the first plan of activities, one or more parameters of the software application respectively associated with each activity, one or more components of the battery-powered device, and one or more parameters corresponding to a component of the battery-powered device to utilize while performing the one or more respective activities of the first plan of activities.

11. The computer program product of claim 9, wherein the estimated first power consumption to complete the first plan of activities is based on historical power consumptions selected from the group consisting of each software application and related parameters of the plurality of software applications of the first plan of activities, one or more functional services of the battery-powered device utilized while performing the one or more respective activities of the first plan of activities, and one or more components of the battery-powered device utilized while performing the one or more respective activities of the first plan of activities.

12. The computer program product of claim 9, wherein the generated first set of implementation details include one or more actions that are selected from the group consisting of:

modifying one or more parameters of an executing software application on the battery-powered device;

disabling one or more functional services of the battery-powered device;

modifying one or more parameters of an executing functional service of the battery-powered device;

disabling one or more components of the battery-powered device; and modifying one or more parameters of a component of the battery-powered device.

13. The computer program product of claim 9, further comprising:

program instructions to identify, while performing the first plan of activities, one or more power consumptions within the battery-powered device that are not included within the first plan of activities;

program instructions to generate a second set of implementation details that manage power consumption within the battery-powered device while performing the first plan of activities, based on the identified one or more consumptions of power within the battery-powered device that are not included within the first plan of activities, the estimated first power consumption, and the determined power level of the first battery of the battery-powered device.

14. A computer system for managing a battery-powered device, the computer system comprising:
one or more computer processors;
one or more computer readable storage media; and
program instructions stored on the computer readable storage media for execution by at least one of the one or more computer processors, the program instructions comprising:
program instructions to identify, a first plan of activities to be performed by a battery-powered device, wherein an activity includes utilization of a software application on the battery-powered device, wherein the first plan of activities includes a list of a plurality of software applications installed on the battery-powered device and a corresponding sequence to utilize the plurality of software applications, and wherein the first plan of activities includes an estimated first power consumption to complete the first plan of activities;
program instructions to determine a level of power of a first battery of the battery-powered device;
program instructions to generate a first set of implementation details that manage power consumption within the battery-powered device while performing the first plan of activities, based on the estimated first power consumption and the determined power level of the first battery of the battery-powered device, wherein the first set of implementation details includes one or more implementation details respectively associated with each activity, and wherein the one or more implementation details respectively associated with each activity manages the consumption of power associated by the battery-powered device while utilizing one or more functional services of the battery powered device, one or more components of the battery powered device, and a software application respectively utilized during each activity; and
in response to initiating the first plan of activities, program instructions to apply the first set of implementation details to the battery-powered device based on a status associated with each activity of the first plan of activities, wherein the status associated with an activity indicates whether the activity is started and a percent of completion of the activity, and wherein program instruction to apply the first set of implementation details to the battery-powered device further comprise:
program instruction to determine a corresponding power level of the first battery prior initiating each activity; and
program instructions to apply, to the battery-powered device, at least one implementation detail that manages the respective consumption of power associated with each activity based on the power level corresponding to the first battery prior to initiating each activity and a percentage of completion for each activity of the first plan of activities.

15. The computer system of claim 14, wherein the first plan of activities further includes: one or more functional services of the battery-powered device to utilize while performing one or more respective activities of the first plan of activities, one or more parameters of the software application respectively associated with each activity, one or more components of the battery-powered device, and one or more parameters corresponding to a component of the battery-powered device to utilize while performing the one or more respective activities of the first plan of activities.

16. The computer system of claim 14, wherein the estimated first power consumption to complete the first plan of activities is based on historical power consumptions selected from the group consisting of each software application and related parameters of the plurality of software applications of the first plan of activities, one or more functional services of the battery-powered device utilized while performing the one or more respective activities of the first plan of activities, and one or more components of the battery-powered device utilized while performing the one or more respective activities of the first plan of activities.

17. The computer system of claim 14, wherein the generated first set of implementation details include one or more actions that are selected from the group consisting of:
modifying one or more parameters of an executing software application on the battery-powered device;
disabling one or more functional services of the battery-powered device;
modifying one or more parameters of an executing functional service of the battery-powered device;
disabling one or more components of the battery-powered device; and
modifying one or more parameters of a component of the battery-powered device.

18. The computer system of claim 14, further comprising:
program instructions to identify, while performing the first plan of activities, one or more power consumptions within the battery-powered device that are not included within the first plan of activities;
program instructions to generate a second set of implementation details that manage power consumption within the battery-powered device while performing the first plan of activities, based on the identified one or more consumptions of power within the battery-powered device that are not included within the first plan of activities, the estimated first power consumption, and the determined power level of the first battery of the battery-powered device.

* * * * *